(12) United States Patent
Leopold

(10) Patent No.: US 11,285,858 B2
(45) Date of Patent: Mar. 29, 2022

(54) HOLDER FOR A BEVERAGE CONTAINER

(71) Applicant: fischer automotive systems GmbH & Co. KG, Horb a.N. (DE)

(72) Inventor: Gunter Leopold, Baiersbronn (DE)

(73) Assignee: fischer automotive systems GmbH & Co. KG, Horb a.N. (DE)

( * ) Notice: Subject to any disclaimer, the term of this patent is extended or adjusted under 35 U.S.C. 154(b) by 0 days.

(21) Appl. No.: 17/189,364

(22) Filed: Mar. 2, 2021

(65) Prior Publication Data

US 2021/0276470 A1    Sep. 9, 2021

(30) Foreign Application Priority Data

Mar. 3, 2020 (DE) ............... 10 2020 105 603.6

(51) Int. Cl.
*B60N 3/00* (2006.01)
*B60N 3/10* (2006.01)

(52) U.S. Cl.
CPC .................. *B60N 3/106* (2013.01)

(58) Field of Classification Search
None
See application file for complete search history.

(56) References Cited

U.S. PATENT DOCUMENTS

| | | | |
|---|---|---|---|
| 1,902,608 A * | 3/1933 | Baltzley | A47G 23/0225 248/313 |
| 5,887,775 A | 3/1999 | Sik | |
| 6,092,775 A * | 7/2000 | Gallant | B60N 3/106 224/926 |
| 6,230,948 B1 | 5/2001 | Christ | |
| 6,758,452 B1 | 7/2004 | Klatt | |
| 9,643,525 B2 | 5/2017 | Dargavell | |
| 2003/0094557 A1 | 5/2003 | Takahashi | |
| 2004/0016783 A1 | 1/2004 | Schultheis | |
| 2004/0079850 A1 | 4/2004 | Takahashi | |
| 2004/0118860 A1* | 6/2004 | Leopold | B60N 3/106 220/737 |
| 2005/0205739 A1 | 9/2005 | Depue | |

(Continued)

FOREIGN PATENT DOCUMENTS

| | | |
|---|---|---|
| CN | 106379214 A | 2/2017 |
| DE | 199 59 599 A1 | 6/2000 |

(Continued)

OTHER PUBLICATIONS

Search Report for related German Patent Application No. 10 2020 105 604.4, dated Nov. 18, 2020.

*Primary Examiner* — Steven M Marsh
(74) *Attorney, Agent, or Firm* — Renner, Otto, Boisselle & Sklar, LLP

(57) ABSTRACT

A holder for a beverage container, for example a beverage can, which is provided for holding the beverage container in a tilt-proof manner in a motor vehicle. Supports are designed so as to laterally support the beverage container by way of a supporting element, which is pivotably mounted at a support carrier and urged by a preloaded support spring into the holder. An electric motor pivots the support carriers inwardly, so that the supporting elements are laterally pushed by the support springs from the outside against the beverage container placed into the holder, in order to hold the beverage container in a tilt-proof manner.

9 Claims, 3 Drawing Sheets

(56) References Cited

U.S. PATENT DOCUMENTS

| | | | |
|---|---|---|---|
| 2006/0243875 A1 | 11/2006 | Chen | |
| 2010/0078531 A1* | 4/2010 | Boinais | B60N 3/106 |
| | | | 248/147 |
| 2016/0304019 A1* | 10/2016 | Dargavell | B60N 3/106 |
| 2020/0376997 A1* | 12/2020 | Sukumar | B60N 3/106 |

FOREIGN PATENT DOCUMENTS

| | | |
|---|---|---|
| DE | 199 50 889 A1 | 4/2001 |
| DE | 101 59 461 B4 | 6/2003 |
| DE | 10231578 A1 | 1/2004 |
| DE | 102012003669 A1 | 10/2012 |
| JP | 2005178639 A | 7/2005 |

* cited by examiner

HOLDER FOR A BEVERAGE CONTAINER

This application claims priority under 35 USC § 119 to German Patent Application No. 10 2020 105 603.6, filed Mar. 3, 2020, the entire disclosure of which is incorporated herein by reference.

TECHNICAL FIELD OF THE INVENTION

The invention relates to a holder for a beverage container, such as a beverage can, a mug, a cup or a bottle.

Such holders are used to hold an inserted beverage container in the most tilt-proof manner possible in a motor vehicle, where these are installed into a center console or an instrument panel, for example. These include an insertion space having an insertion opening for inserting the beverage container. In relation to adapting to beverage containers having different diameters, supports are known, which can be moved laterally into the insertion space so as to decrease an inside diameter of the insertion space. The supports laterally support a beverage container placed into the insertion space.

DISCUSSION OF THE RELATED ART

U.S. Pat. No. 9,643,525 B2 describes a holder for a beverage container, including a cup-shaped insertion space, at the upper rim of which, surrounding an insertion opening, three lower, circular arc-shaped supports, which extend in a circumferential direction, and three vertical pivot axes, which are each offset from one another by 120° in the circumferential direction, are pivotably mounted. Three oppositely oriented upper, likewise circular arc-shaped, supports are disposed on the three lower supports, which can likewise be pivoted about three pivot axes, which are offset from one another by 120° in the circumferential direction, wherein the pivot axes of the upper supports are disposed between the lower supports. "Oppositely oriented" means that the upper and lower supports are each pivotably mounted at, viewed in the circumferential direction, opposite ends, and can be pivoted into the insertion opening in opposite directions. Using a control ring, which is disposed rotatably about a center line of the insertion space on the supports, the upper and lower supports can be pivoted into and out of the insertion opening. The control ring includes curved radial cams for the upper supports, and the upper supports include control tenons engaging in radial cams of the lower supports, so that the control ring, during a rotation of the control ring in one direction, pivots the upper supports inwardly and, during a rotation in the opposite direction, pivots these outwardly. The upper supports entrain the lower supports in pivoting inwardly and outwardly.

Patent application US 2005/0 205 739 A1 discloses a holder for a beverage container, including an insertion space and four supports, which are each disposed offset from one another by 90° in a circumferential direction at a circumference of the insertion space. The four supports are vertically disposed and pivotable about horizontal pivot axes. Beneath the insertion space, the known holder includes an actuator plate, which can be rotated about a center line of the insertion space and driven by an electric motor and which, on the outer rim thereof, includes four sections that each extend 90° in a circumferential direction and can be interpreted as radial cams for the supports. These radial cams extend in a curved manner at a distance, which increases in the circumferential direction, from the axis of rotation of the actuator plate. During a rotation of the actuator plate in one direction, the radial cams push lower ends of the supports resting against the outside of the radial cams to the outside, thereby pivoting upper ends of the supports to the inside, so as to rest laterally against a beverage container placed into the insertion space.

SUMMARY OF THE INVENTION

It is the object of the invention to provide a holder for a beverage container including one or more supports that can be driven by an electric motor and that can be applied laterally against a beverage container placed into an insertion space using a specified or specifiable supporting force.

The holder according to the invention is provided for holding a beverage container, such as a beverage can, a mug, a cup or a bottle, in the most tilt-proof manner possible, in particular in a motor vehicle. This includes an insertion space having an insertion opening for inserting a beverage container. The insertion space and the insertion opening can be closed in the circumferential direction or include one or more discontinuities, recesses or the like on the circumference. The holder furthermore includes at least one support, which can be moved laterally into the insertion space so as to reduce an inside diameter of the insertion space and so as to be laterally appliable against the beverage container placed into the insertion space, in order to laterally support the beverage container. "Lateral" here means a direction perpendicular to the insertion direction of the beverage container into the insertion space. The holder according to the invention preferably includes multiple supports, which are uniformly or non-uniformity distributed over the circumference. The invention will be described hereafter based on one support.

The holder additionally includes an electromotive support drive including an electric motor by which the support can be moved into and out of the insertion space. According to the invention, the support includes a support spring, by way of which the electromotive support drive moves the support into, and preferably also out of, the insertion space. By way of the support spring, the electromotive support drive pushes the support in a spring-loaded manner laterally against the beverage container placed into the insertion space. The support spring can also be considered part of the support drive. The support spring is one element in a force transmission chain from the electric motor to the support. The support spring causes the support to rest in a spring-loaded manner laterally against the beverage container, and compensates for tolerances. A spring force only builds when the support rests against the beverage container, so that the electric motor can be shut off relatively precisely so that the support rests laterally against the beverage container with an intended supporting force. Another advantage of the invention is that the support, when not resting against the beverage container, can be moved into and out of the insertion space almost without force. A noteworthy driving force is only required for loading the support spring when the support rests against the beverage container. In this way, relatively quick movements are possible.

A preferred embodiment of the invention provides a two-piece or multi-piece design for the support, including a supporting element that is movably disposed at a support carrier, which, in turn, is movable. The support spring acts between the supporting element and the support carrier. Moving the support carrier into the insertion space causes the supporting element to be applied laterally against the beverage container placed into the insertion space of the holder. The support spring is loaded during further movement and pushes the supporting element in a spring-loaded manner against the beverage container.

The support spring is preferably preloaded. The preload is a spring force that the support spring has when not resting against the beverage container. When the spring rests against the beverage container, the electromotive support drive increases the spring force with which the support spring pushes laterally against the beverage container. The preload can be easily implemented by way of the aforementioned two-piece or multi-piece support. The preload has the advantage that the travel for loading the support spring is shortened, and the position of the outwardly moved support is independent of the support spring.

According to a refinement of the invention, the supporting element is movable to a limited extent at the support carrier, and the support spring is clamped between the support carrier and the supporting element. The limited mobility of the supporting element in relation to the support carrier effectuates, in particular, the preload of the support spring, which only relaxes as much as the limited mobility of the supporting element in relation to the support carrier allows.

For example, sliding guidance of the support is possible. One embodiment of the invention provides for the support to be pivotably mounted.

One embodiment of the invention provides for the support to include the supporting element and the support carrier, at which the supporting element is pivotably mounted, and for the supporting element and the support carrier to be pivotable about parallel pivot axes. The supporting element and the support carrier can have different pivot axes, and one embodiment of the invention provides coaxial pivot axes of the supporting element and the support carrier.

The features and feature combinations, designs and embodiments of the invention mentioned above in the description, and the features and feature combinations mentioned hereafter in the description of the figures and/or shown in a figure, can be used not only in the respective indicated or illustrated combinations, but also in other essentially arbitrary combinations, or alone. Embodiments of the invention that do not include all the features of a dependent claim are possible. It is also possible to replace individual features of a claim with other disclosed features or feature combinations. Embodiments of the invention that do not include all the features of the exemplary embodiment or exemplary embodiments, but an essentially arbitrary portion of the characterizing features of one exemplary embodiment, optionally in combination with one, more or all the features of one or more further exemplary embodiments, are possible.

BRIEF DESCRIPTION OF THE DRAWINGS

The invention will be described in more detail hereafter based on two exemplary embodiments shown in the drawings. In the drawings.

The drawings are simplified, schematic illustrations serving to provide an understanding of the invention and to describe the invention.

DETAILED DESCRIPTION OF THE INVENTION

Figure 1:
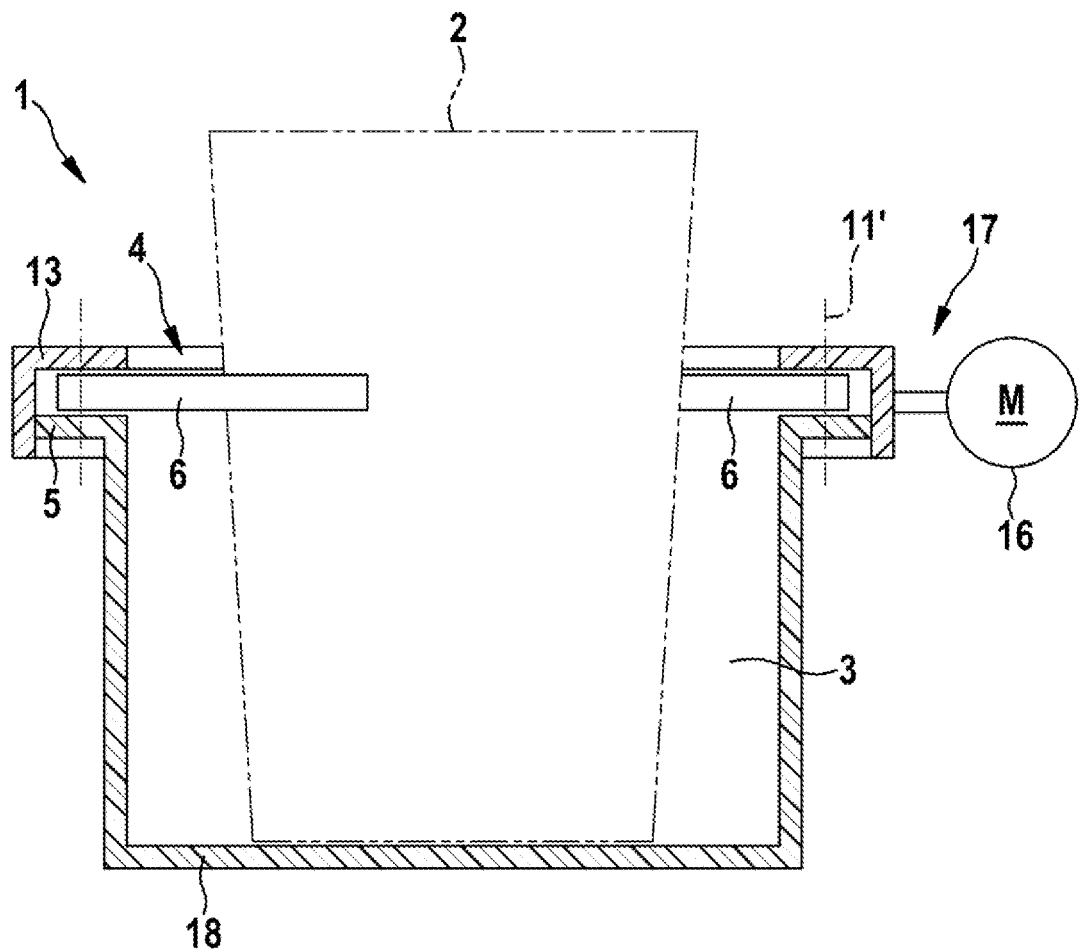
FIG. 1 shows an axial section of a first exemplary embodiment of a holder according to the invention for a beverage container.
Figure 2:
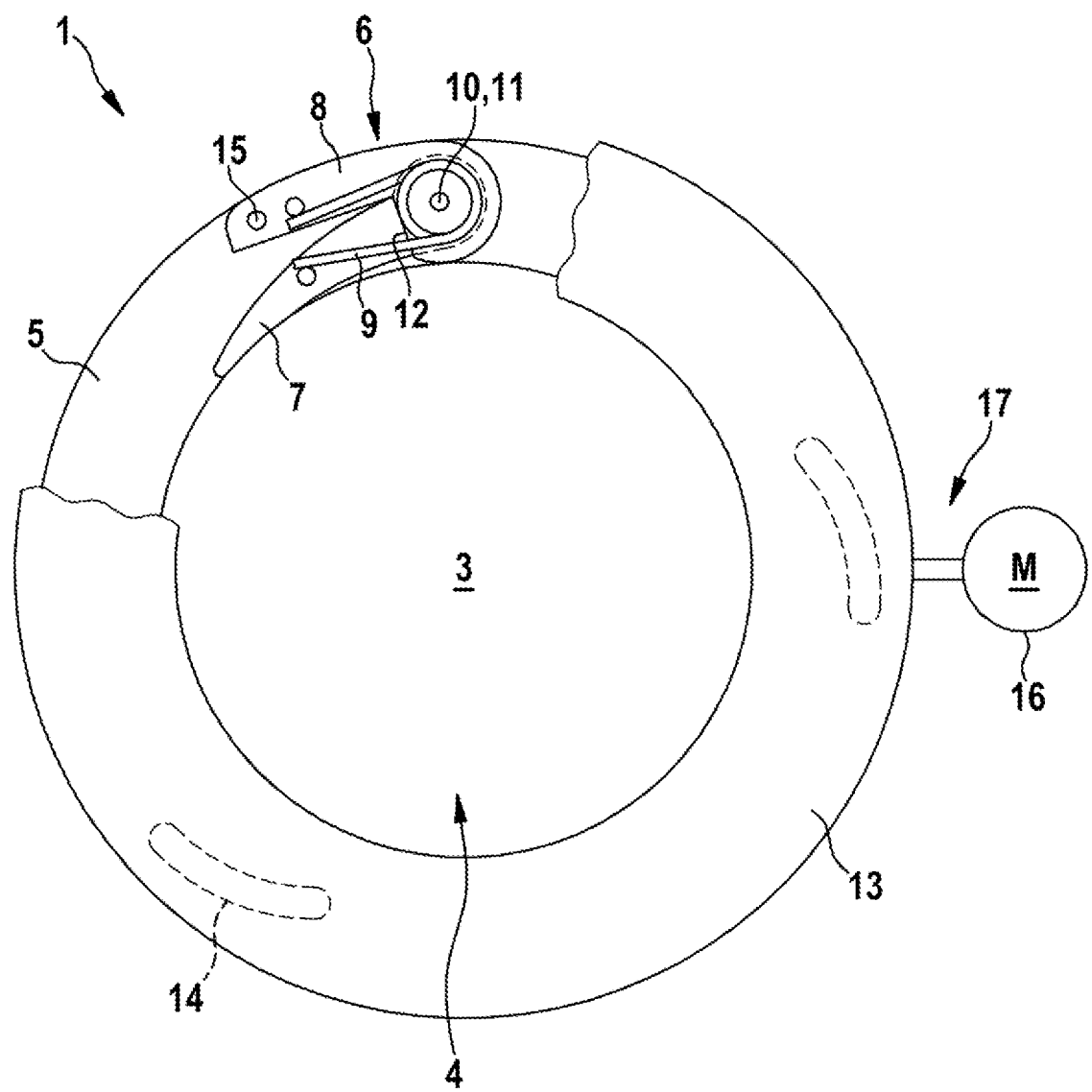
FIG. 2 shows a view of the holder from FIG. 1 from above.

The holder 1 according to the invention for a beverage container 2 shown in FIGS. 1 and 2 is intended, for example, for installation in a center console of a motor vehicle (not shown). This includes a cup-shaped insertion space 3 having an insertion opening 4 for inserting the beverage container 2. The beverage container 2 shown with dash-dotted lines in FIG. 1 is a beverage can, a mug, a cup or a bottle, for example.

Three supports 6 are disposed on a circular ring-shaped flange 5 surrounding the insertion opening 4, and each include a supporting element 7, a support carrier 8 and a support spring 9. In the exemplary embodiment, the supporting element 7 and the support carrier 8 are strip-shaped elements, which are disposed in a radial plane of the insertion space 3 and are curved in a crescent shape, corresponding to a radius of the insertion opening 4. Both the supporting element 7 and the support carrier 8 include a bearing hole close to one of the ends thereof, from which these extend in the same circumferential direction of the insertion opening 4. By way of the bearing holes, the supporting element 7 and the support carrier 8 are pivotably mounted on a shared bearing tenon 10, which projects upwardly from the flange 5 parallel to an imaginary center line of the insertion space 3. The flange 5 includes one bearing tenon 10 for each support 6, on which the supporting element 7 and the support carrier 8 of the respective support 6 are pivotably mounted. The supporting element 7 and the support carrier 8 of each support 6 thus have coaxial pivot axes 11'. In the exemplary embodiment, the bearing tenons 10, and thus the pivot axes 11' of the supports 6, supporting elements 7 and support carriers 8, are uniformly distributed over a circumference, however, this is not essential for the invention. The bearing holes of the supporting elements 7 and of the support carriers 8 and the bearing tenons 10 form pivot mountings 11 for the supports 6, the supporting elements 7 and the support carriers 8, the pivot axes 11' of which define the bearing tenons 10.

The support spring 9 is a torsion spring in the exemplary embodiment, urging the supporting element 7 and the support carrier 8 apart. A pivot angle of the supporting elements 7 in relation to the respective support carrier 8 is limited by stops 12. The supporting element 7 and the support carrier 8 hold the support spring 9 therebetween with a preload. Other springs, such as a yoke spring or a leaf spring, are also possible to use as the support spring 9 (not shown). The list is by way of example and not exhaustive.

A control ring 13, which covers the supports 6, is disposed coaxially to the insertion space 3, above the flange 5. The control ring 13 can be rotated about the center line of the insertion space 3. The control ring 13 is discontinuously illustrated in FIG. 2, in order to render one of the supports 6 visible.

The control ring 13 includes radial cams 14 on the bottom side, which are shown with dotted lines in FIG. 2. The radial cams 14 are such that the radial distance thereof from the center line of the insertion space 3 is reduced in a circumferential direction. Control tenons 15, which project from the support carriers 8 of the supports 6 in the direction of the control ring 13, engage in the radial cams 14. By rotating the control ring 13 in one direction, the support carriers 8 are pivoted to the inside in the direction of the center line of the insertion space 3, which is to say into the insertion space 3, so as to reduce an inside diameter of the insertion space 3.

A rotation of the control ring 13 in the opposite direction pivots the support carriers 8 to the outside.

The support springs 9 move the supporting elements 7, together with the support carriers 8, until, during inward pivoting, the supporting elements 7 rest laterally from the outside against the beverage container 2 placed into the insertion space 3. Further inward pivoting of the support carriers 8 increases a spring force, with which the support springs 9 push the supporting elements 7 laterally from the outside against the beverage container 2, beyond the preload of the support spring 9.

The control ring 13 can be rotatably driven by an electric motor 16, which is only indicated in the form of a symbol, by way of a gearbox, which is not itself shown. During the inward pivoting of the supports 6, the electric motor 16 is shut off after a predetermined brief time period, or after a predetermined short angle of rotation, after the supporting elements 7 rest laterally against the outside of the beverage container 2 placed into the insertion chamber 3, by which a desired spring force is achieved, with which the support springs 9 push the supporting elements 7 laterally from the outside against the beverage container 2. The supporting elements 7 resting against the outside of the beverage container 2 can be detected by a sudden increase in torque necessary for rotating the control ring 13, since, starting with the contact of the supporting elements 7 against the outside of the beverage container 2, the preload of the support springs 9 has to be overcome, and the support springs 9 are loaded, whereas the support carriers 8 can be pivoted freely and without noteworthy force until the supporting elements 7 rest against the beverage container 2. The sudden increase in torque causes a sudden increase in a motor current of the electric motor 16, which can be measured.

The electric motor 16 is switched on when the beverage container 2 is placed into the insertion space 3 of the holder 1 according to the invention, for example by a switch (not shown), at a bottom 18 of the insertion space 3 or by way of another sensor system. The electric motor 16, the gearbox (not shown), and the control ring 13 form an electromotive support drive 17 for pivoting the supports 6.

The number of three supports 6 is not mandatory for the invention, and more or fewer supports 6 are also possible. The shape and design of the supports 6 are also not mandatory for the invention. What is essential is that the supports 6, or the supporting elements 7 thereof, are pushed laterally by way of the support springs 9, or other spring elements, from the outside against the beverage container 2 placed into the insertion space 3 of the holder 1 according to the invention, so that the supports 6 are freely movable until these rest laterally against the outside of the beverage container 2, and the support springs 9 are only loaded when the supports 6, or the supporting elements 7, rest against the beverage container 2.

Figure 3:
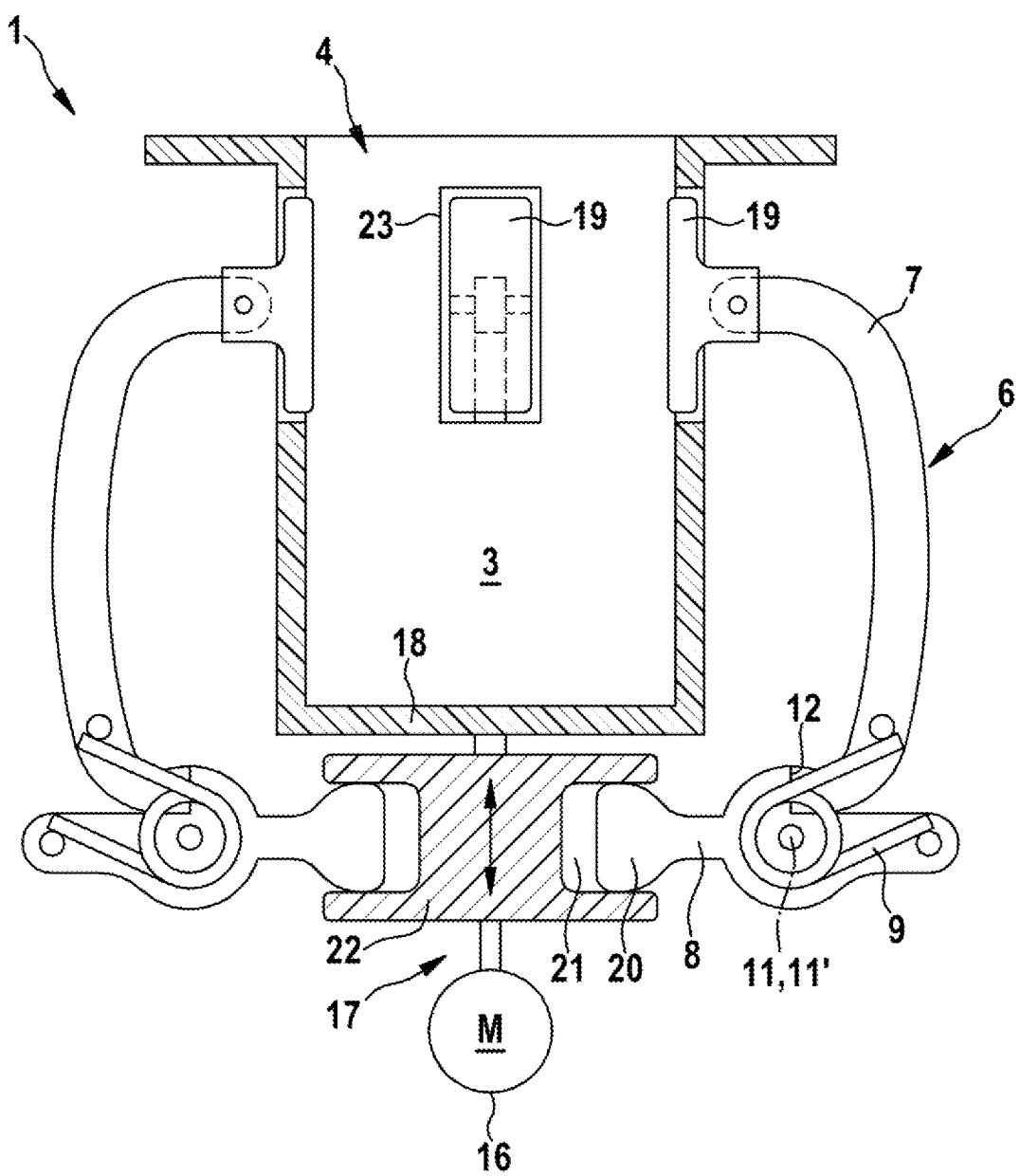
FIG. 3 shows an axial section of a second exemplary embodiment of a holder according to the invention for a beverage container.

For the following description of FIG. 3, the same reference numerals as in FIGS. 1 and 2 are used for components that agree with FIGS. 1 and 2, and in addition reference is made to the description with respect to FIGS. 1 and 2. The holder 1 according to the invention, shown in FIG. 3, for a beverage container 2, such as a beverage can, a mug, a cup or a bottle, is likewise intended to be installed in a center console of a motor vehicle (not shown). This likewise includes a cup-shaped insertion space 3 including an insertion opening 4 for inserting the beverage container 2, which is not shown in FIG. 3.

In the exemplary embodiment, the holder 1 of FIG. 3 includes four supports 6, which are vertically disposed, substantially outside the insertion space 3. "Vertical" means an arrangement of the supports 6 in the axial plane of the insertion space 3. The supports 6 can be pivoted about pivot axes 11' that are tangential to the insertion space 3 and located outside the circumference and beneath a bottom 18 of the insertion space 3.

As in FIGS. 1 and 2, the supports 6 have a multi-piece design and in each case include a supporting element 7 and a support carrier 8, which can be pivoted about the pivot axes 11'.

The supporting element 7 and the support carrier 8 of a support 6 can thus be pivoted about the same coaxial pivot axes 11'.

The supporting elements 7 of the holder 1 of FIG. 3 are bracket-shaped and extend upwardly, close to the insertion opening 4, where these include retaining jaws 19 pivotably mounted thereon. The retaining jaws 19 can be moved through windows 23 in a circumferential wall of the insertion space 3, into the insertion space 3.

A pivot angle between the supporting elements 7 and the support carriers 8 is limited by stops 12 at the supporting elements 7 and the support carriers 8.

As in FIGS. 1 and 2, the supports 6 of the holder 1 according to the invention of FIG. 3 include a torsion spring, serving as the support spring 9, which is supported on the support carrier 8 and urges the support element 7, together with the retaining jaw 19, into the insertion space 3. The support springs 9 are preloaded due to the limitation of the pivot angle between the supporting elements 7 and the support carriers 8. Other springs, such as yoke springs or leaf springs, may also be used as the support spring 9 (not shown).

The support carriers 8 include ball-shaped heads 20 at inwardly directed ends, which engage in a circumferential groove 21 on a circumference of an actuator plate 22, which is disposed coaxially to the insertion space 3, beneath the bottom 18 thereof, and can be moved in the axial direction to the insertion space 3. Lowering, which is to say removing the actuator plate 22 from the bottom 18 of the insertion space 3, causes the supports 6 to be pivoted such that the supporting elements 7 thereof, together with the holding jaws 19, move into the insertion space 3, whereby the retaining jaws 19 are pushed laterally from the outside against a beverage container 2, which is not shown in FIG. 3, so as to hold this in the insertion space 3 in a tilt-proof manner. Raising, which is to say moving the actuator plate 22 closer to the bottom 18 of the insertion space 3, causes the supports 6 to be pivoted outwardly again into the shown position.

The holder 1 includes an electric motor 16, which is indicated in the form of a symbol, for raising and lowering the actuator plate 22, and a gearbox, which is not itself shown and which, together with the electric motor 16 and the actuator plate 22, forms an electromotive support drive 17.

When the beverage container 2, which is not shown in FIG. 3, is placed into the insertion space 3 of the holder 1, the electric motor 16 lowers the actuator plate 22, and pivots the supporting elements 7 of the supports 6, together with the retaining jaws 19, to the inside. The electric motor 16 is shut off after an established time period, or after an established number of revolutions, after the retaining jaws 19 rest against the beverage container 2, whereby a desired pressing force of the retaining jaws 19 at the beverage container 2 is achieved. The retaining jaws 19 resting against the beverage container 2 can, as described above with respect to FIGS. 1 and 2, be detected by a sudden increase in the current for the electric motor 16.

The insertion of the beverage container 2 into the insertion space 3 can thus be detected by way of a switch (not shown) arranged at the bottom 18 of the insertion space 3, or by way of another sensor system.

It is not mandatory for the holder 1 to include four supports 6, it also being possible for the holder to include fewer or more supports 6, which are uniformity or non-uniformly distributed over the circumference.

LIST OF REFERENCE NUMERALS

1 holder
2 beverage container
3 insertion space
4 insertion opening
5 flange
6 support
7 supporting element
8 support carrier
9 support spring
10 bearing tenon
11 pivot mounting
11' pivot axis
12 stop
13 control ring
14 radial cam
15 control tenon
16 electric motor
17 electromotive support drive
18 bottom
19 retaining jaw
20 ball-shaped head
21 groove
22 actuator plate
23 window

The invention claimed is:

1. A holder for a beverage container, comprising an insertion space including an insertion opening for inserting the beverage container, comprising a support, which can be moved laterally into the insertion space so as to reduce an inside diameter of the insertion space and so as to be laterally appliable against the beverage container placed into the insertion space, and comprising an electromotive support drive, which comprises an electric motor by which the support can be moved into the insertion space, wherein the support comprises a support spring, by way of which the electromotive support drive moves the support into the insertion space and by way of which the support can be laterally pushed by the electromotive support drive in a spring-loaded manner against the beverage container placed into the insertion space.

2. The holder according to claim 1, wherein the support comprises a supporting element, which can be pushed laterally against the beverage container placed into the insertion space of the holder, and a movable support carrier, at which the supporting element is movably disposed, the support spring is supported on the support carrier and urges the support element into the insertion space, and the electromotive support drive moves the support carrier.

3. The holder according to claim 1, wherein the support spring is preloaded.

4. The holder according to claim 2, wherein the supporting element is movable to a limited extent at the support carrier, and the support spring is clamped between the support carrier and the supporting element.

5. The holder according to claim 1, wherein the holder comprises a pivot mounting including a pivot axis about which the support can be pivoted.

6. The holder according to claim 5, wherein the supporting element and the support carrier can be pivoted about parallel pivot axes.

7. The holder according to claim 6, wherein the supporting element and the support carrier can be pivoted about coaxial pivot axes.

8. The holder according to claim 1, wherein the support spring is part of a force transmission chain arranged from the electric motor to the support.

9. The holder according to claim 2, wherein during movement of the movable support carrier, the support spring remains in an unloaded state until the supporting element rests against the beverage container.

* * * * *